(12) United States Patent
Abramovitch

(10) Patent No.: US 7,843,627 B2
(45) Date of Patent: Nov. 30, 2010

(54) COHERENT DEMODULATION WITH REDUCED LATENCY ADAPTED FOR USE IN SCANNING PROBE MICROSCOPES

(75) Inventor: Daniel Y. Abramovitch, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/324,042

(22) Filed: Nov. 26, 2008

(65) Prior Publication Data
US 2010/0128342 A1    May 27, 2010

(51) Int. Cl.
*G02F 2/00* (2006.01)
(52) U.S. Cl. .................................................... 359/325
(58) Field of Classification Search .................. 359/325
See application file for complete search history.

(56) References Cited

U.S. PATENT DOCUMENTS

| 4,488,119 | A | * | 12/1984 | Marshall | 329/323 |
| 5,917,441 | A | * | 6/1999 | Valentine et al. | 342/20 |
| 6,114,971 | A | * | 9/2000 | Nysen | 340/10.3 |
| 6,463,091 | B1 | * | 10/2002 | Zhodzicshsky et al. | 375/149 |
| 6,633,226 | B1 | * | 10/2003 | Nysen | 340/10.1 |

* cited by examiner

*Primary Examiner*—Daniel Petkovsek

(57) ABSTRACT

A signal demodulator and the method of using the same in a scanning probe microscope or the like to provide a feedback path with reduced latency are disclosed. The demodulator includes an input port, a first mixer and a first integrator. The input port receives an input signal having a frequency component at a signal frequency. The input signal is characterized by a signal amplitude at that frequency. The first mixer mixes the input signal with a first local oscillator signal at the signal frequency to generate a first mixed signal. The first integrator integrates the first mixed signal for an integer number of periods of the signal frequency to provide a first output signal.

20 Claims, 10 Drawing Sheets

COHERENT DEMODULATION WITH REDUCED LATENCY ADAPTED FOR USE IN SCANNING PROBE MICROSCOPES

BACKGROUND OF THE INVENTION

Scanning probe microscopes are a class of imaging techniques in which a tip that interacts locally with a sample is scanned over the surface of the sample to generate a three-dimensional image representing the properties of the surface. For example, in atomic force microscopy, the surface interaction force between the probe tip and the sample are measured at each point on the sample. The tip has a very small end and is mounted on the end of a cantilevered arm. As the tip is moved over the surface of the sample, the arm deflects in response to the changes in topology of the surface. The vertical position of the cantilever arm relative to the sample is adjusted to maintain the arm in a predetermined state. The vertical position as a function of position on the sample can then be used to provide an image of the surface.

Images are typically acquired in one of two modes. In the contact or constant force mode, the tip is brought into contact with the sample and the tip moves up and down as the tip is moved over the surface. The deflection of the arm is a direct measure of force and topographical variations. A feedback controller measures the deflection and adjusts the height of the probe tip so as to maintain constant force between the cantilevered probe and the surface, i.e., the arm at a fixed deflection. This mode of operation can subject the sample being imaged to excessive shear forces that can alter or damage the sample. This limitation is particularly acute when biological samples or macromolecules are being imaged.

Accordingly, some form of AC mode of scanning is often preferred for these applications. In the AC, or dynamic mode, the tip and arm are oscillated at a frequency near the resonant frequency of the arm. The height of the tip can be controlled such that the tip avoids contact with the sample surface, sampling short-range tip/sample forces. Alterations in the oscillation parameters from short range forces between the tip and the sample result in changes in the oscillations of the tip. Alternatively, the tip can be allowed to make light intermittent contact with the sample only at the bottom of the oscillation cycle. Contact between the probe tip and the sample results in an alteration of the amplitude, phase and/or frequency of the oscillation. The controller adjusts the height of the probe over the sample such that the oscillation amplitude, phase and/or frequency is kept at a predetermined constant value. Since the tip is not in constant contact with the sample, the shear force applied to the sample is significantly less than in the mode in which the tip is in constant contact. For soft samples, this mode reduces the damage that the tip can inflict on the sample and also provides a more accurate image of the surface in its non-disturbed configuration.

The image is constructed one point at a time and is limited by the rate at which the tip can be moved relative to the sample, as well as the time required for the servo loop to reposition the tip vertically to maintain the distance between the surface and the tip. The feedback control system that is used to position the arm vertically over the sample must extract the needed information from the oscillatory signal provided by the system that tracks the position of the tip as a function of time. The process of extracting the information from the oscillating signal will be referred to as demodulation in the following discussion.

When a demodulated error signal is used in a feedback control loop, a significant delay is incurred in the generation of the error signal. The delay reflects the time needed to extract the information from the signal. This time is typically many periods of the oscillation of the signal. This delay results in a phase lag in the feedback loop, and hence, reduces the speed with which the feedback loop can adjust to changes in the oscillatory signal.

In AC mode, the time needed to detect a change in one or more of the oscillatory parameters of the arm is many periods of the oscillation. Hence, each time the position of the arm is moved relative to the sample, the servo system must wait for a period of time that is long compared to the oscillation period to determine the new amplitude, phase, or frequency of the oscillation and then alter the distance between the arm and the surface to return the oscillatory parameter of interest to the desired value. As a result, the time needed to provide an image can be excessive.

SUMMARY OF THE INVENTION

The present invention includes a signal demodulator and the method of using the same in a scanning probe microscope or the like to provide a feedback path with reduced latency. The demodulator includes an input port, a first mixer and a first integrator. The input port receives an input signal having a frequency component at a signal frequency. The input signal is characterized by a signal amplitude at that frequency. The first mixer mixes the input signal with a first local oscillator signal at the signal frequency to generate a first mixed signal. The first integrator integrates the first mixed signal for an integer number of periods of the signal frequency to provide a first output signal.

In one embodiment, the local oscillator signal is phase-locked to the frequency component of the input signal such that the first output signal has an amplitude substantially equal to said amplitude of said input signal at said signal frequency. The phase-locked loop can include a second mixer that mixes the input signal with a second local oscillator signal that is 90 degrees out of phase with the first local oscillator signal to provide a second mixed signal. The phase-locked loop can also include a second integrator that integrates the second mixed signal for an integer number of periods of the signal frequency to provide a second output signal and a servo loop that adjusts an oscillator such that the second output signal has an average signal intensity substantially equal to zero.

The demodulator can also include a post processing filter that attenuates harmonics of the signal frequency in the first output signal to provide a filtered first output signal and a preprocessing filter that removes any DC component from said input signal.

DETAILED DESCRIPTION OF THE PREFERRED EMBODIMENTS OF THE INVENTION

Figure 1:
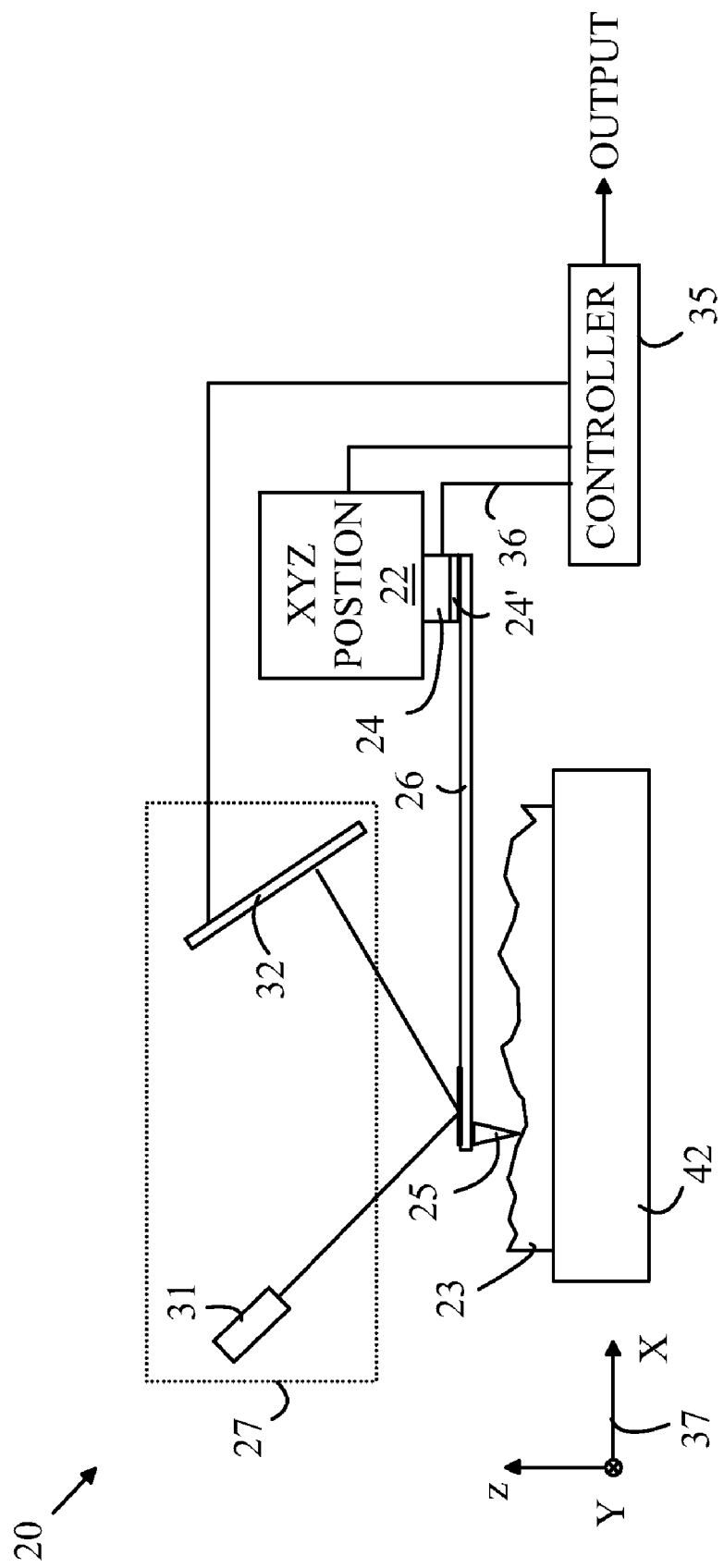
FIG. 1 illustrates one embodiment of an atomic force microscope according to the present invention.

The manner in which the present invention provides its advantages can be more easily understood with reference to FIG. 1, which illustrates one embodiment of an atomic force microscope according to the present invention. Microscope 20 includes a probe assembly and a stage 42 on which a sample 23 to be imaged is mounted. The probe assembly includes a tip 25 that is mounted on a cantilever 26 that deflects in response to forces on probe tip 25. The degree of deflection of cantilever 26 is measured by a detector 27. In the embodiment shown in FIG. 1, the detector 27 includes a light source 31 and a photodetector 32. Light source 31 illuminates a reflector on cantilever 26, and the location of the reflected light is detected by a photodetector that provides a signal related to the degree of deflection of cantilever 26.

One end of cantilever 26 is attached to an electro-mechanical actuator such as piezoelectric actuator 22 that can move that end in three dimensions, denoted by x, y, and z as shown at 37. An AC actuator 24 that vibrates the fixed end of cantilever 26 is disposed between actuator 22 and cantilever 26 and receives a signal over line 36 that controls the amplitude of the vibrations. The fixed end of the cantilever arm can be attached to AC actuator 24 by a probe mount 24'. AC actuator 24 can be constructed from lead zirconate titanate (PZT) that is driven by an AC drive signal at a frequency $\omega_0$ by controller 35. Here, $\omega_0$ is chosen to be a frequency that is substantially equal to one of the resonant frequencies of cantilever 26. The signal from photodetector 32 includes an AC component at $\omega_0$ that is the result of this induced vibration. This signal will be referred to as the cantilever arm signal in the following discussion. The amplitude and phase of this signal and its harmonics depend on the interaction between probe tip 25 and sample 23 in the vicinity of probe tip 25, and hence, the amplitude of this signal depends on the distance between tip 25 and the sample. Controller 35 controls the Z-coordinate of the cantilever through actuator 22 to maintain a parameter related to this signal at a predetermined value while the x and y coordinates of the probe tip are varied to provide an image of the sample surface, e.g., the height of the cantilever end as a function of x and y, which is output by controller 35. It should be noted that an image could also be formed utilizing amplitude or phase the cantilever arm signal at $\omega_0$ or any of the higher harmonics of this frequency.

It should be noted that the arrangement shown in FIG. 1 is only one of many possible electro-mechanical configurations. One class of microscopes, the probe tip is scanned in 3 axes. In another class of microscopes, the sample is scanned in 3 axes while the base of the cantilever arm remains stationary. In yet another class of microscopes, sample is scanned in some axes and the cantilever arm in others. Accordingly, the arrangement shown in FIG. 1 is for illustrative purposes. However, the present invention applies equally well to all embodiments/designs.

Figure 2:
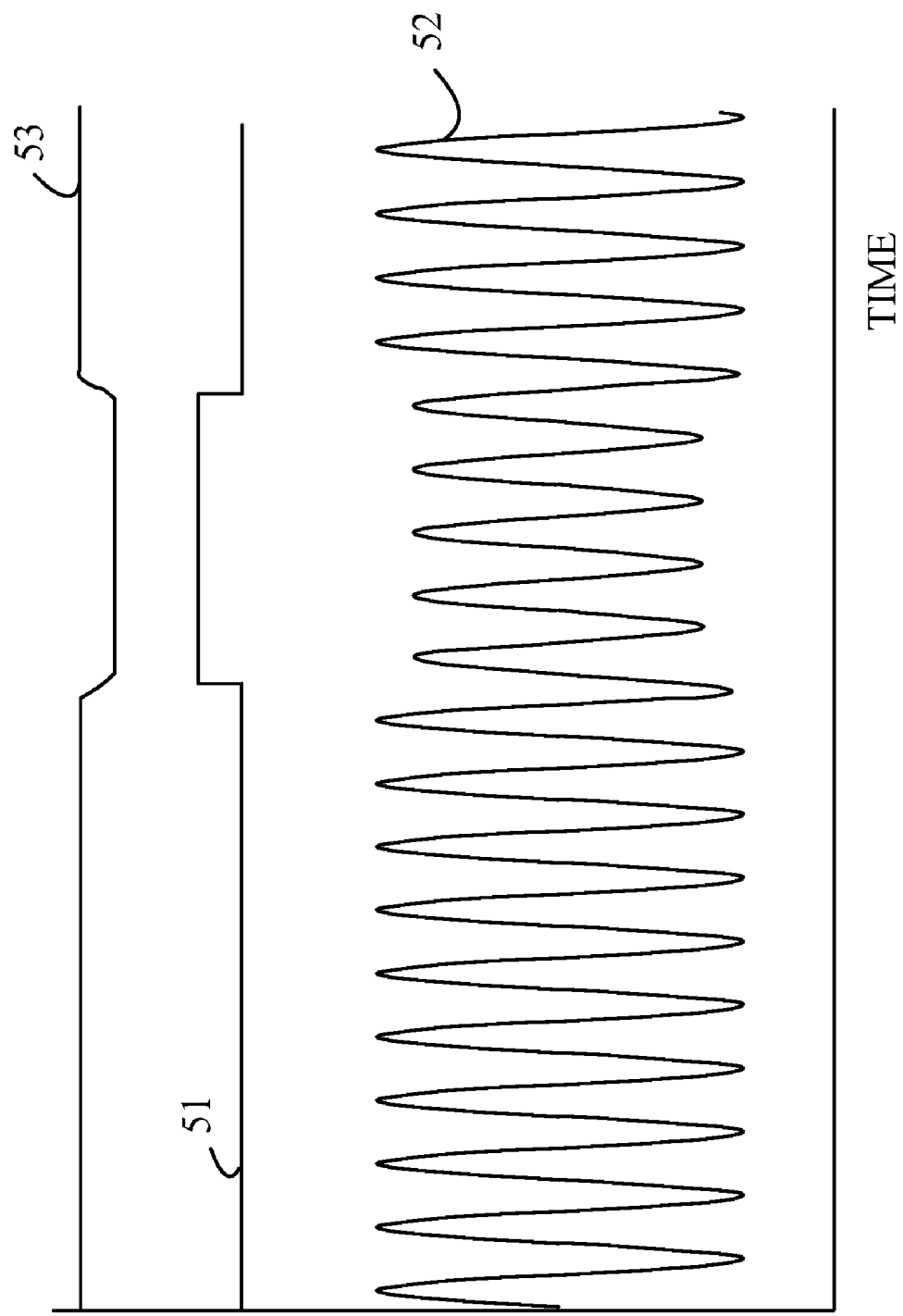
FIG. 2 illustrates the output of an atomic force microscope in response to a change in height of a sample being scanned.

Refer now to FIG. 2, which illustrates the output of an atomic force microscope in response to a change in height of a sample being scanned. Curve 51 illustrates the change in height of the sample that is encountered as the atomic force microscope scans across the sample. The cantilever arm signal is shown at 52. The results of demodulating the cantilever arm signal to determine the amplitude of the cantilever arm signal are shown at 53.

The present invention utilizes an improved coherent demodulation scheme to extract the amplitude and phase of the cantilever arm signal and possibly its harmonics. In coherent demodulation, the signal to be demodulated is separately mixed with an in-phase and a quadrature signal that is 90 degrees out of phase with the in-phase signal. For the purposes of this discussion, it will be assumed that the in-phase signal at a frequency $\omega_0$ is given by $\sin(\omega_0 t)$, and the corresponding quadrature signal is $\cos(\omega_0 t)$. However, any sinusoids that are 90 degrees out of phase could be utilized. Denote the cantilever arm signal by s(t) where $$s(t) = C\sin(\omega_0 t + \phi) + n(t),$$

and n(t) is not correlated with $\sin(\omega_0 t)$.

The result of mixing the in-phase signal $\sin(\omega_0 t)$ with s(t) is $$I(t) = s(t)\sin(\omega_0 t).$$

Similarly, the signal obtained by mixing the quadrature signal, $\cos(\omega_0 t)$ with s(t) is $$Q(t) = s(t)\cos(\omega_0 t).$$

It can be shown that for T large compared to the period of $\omega_0$, $$I_{sum} = \frac{2}{T}\int_0^T I(t)\,dt \approx C\cos(\varphi)$$

and $$Q_{sum} = \frac{2}{T}\int_0^T Q(t)\,dt \approx C\sin(\varphi)$$

This property is used in prior art coherent demodulation schemes to obtain the amplitude and phase of the cantilever arm signal. Namely, $$C = \sqrt{I_{sum}^2 + Q_{sum}^2}$$

and $$\phi = \arctan(Q_{sum}/I_{sum})$$

In such prior art systems, phase-locked loops and lock-in amplifiers are used to perform the integration. However, the requirement that T be long compared to the period of the s(t) introduces delays into the system that limit the bandwidth of the servo. The present invention provides a method for extracting the amplitude and phase without requiring long integration times.

Figure 3:
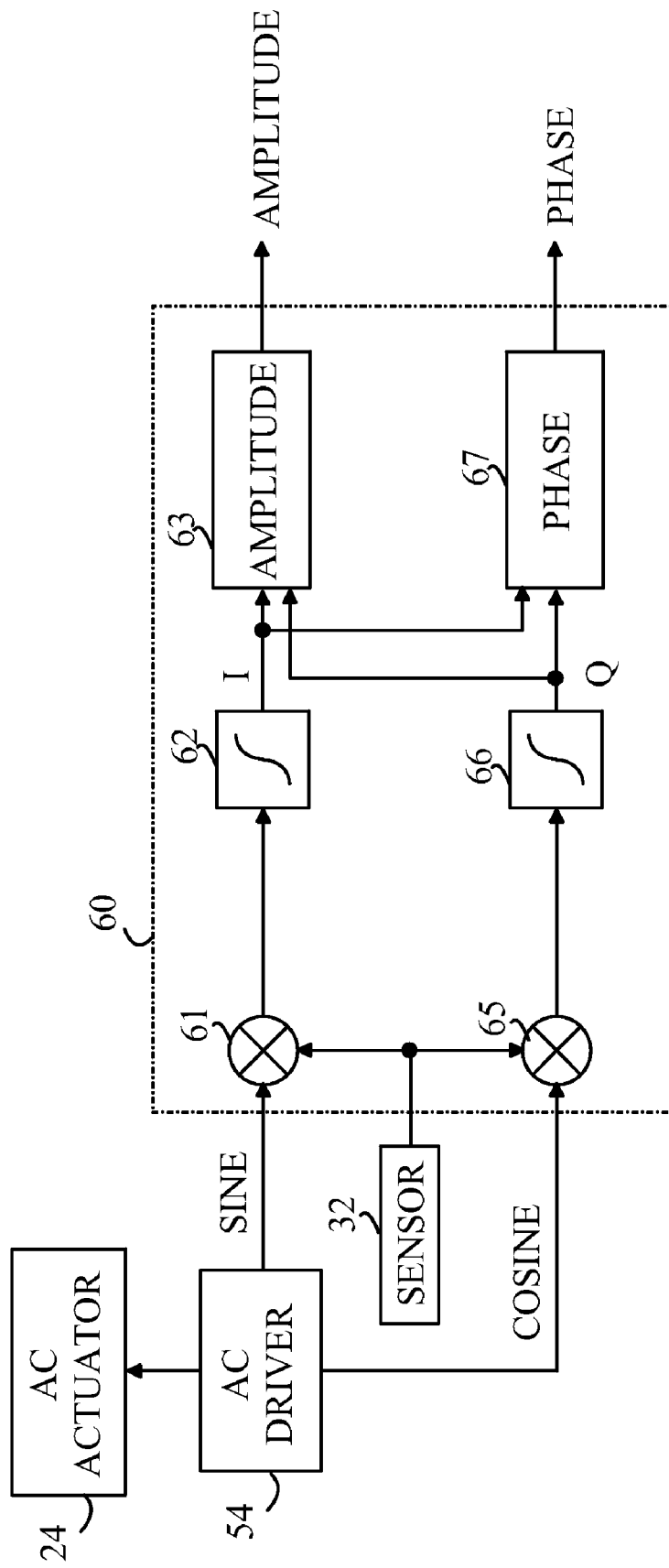
FIG. 3 illustrates a coherent demodulator according to one embodiment of the present invention.

Refer now to FIG. 3, which illustrates a coherent demodulator according to one embodiment of the present invention. Coherent demodulator 60 receives two signals from the AC driver 54 that drives the AC actuator 24. AC driver 54 generates a sinusoid that is output to AC actuator 24. AC driver 54 also generates two sinusoids that are out of phase with one another by 90 degrees. To simplify the following discussion, these two sinusoids will be assumed to be sine and cosine; however, other choices of 90 degree out of phase signals could be utilized. The sine output is mixed in mixer 61 with the cantilever arm signal generated by sensor 32. The output of mixer 61 is integrated by integrator 62 to provide a signal, I, that is used by circuits 63 and 67 to extract the amplitude and phase, respectively, of the cantilever arm signal.

Similarly, the cosine output from AC driver 54 is mixed in mixer 65 with the cantilever arm signal generated by sensor 32. The output of mixer 65 is integrated by integrator 66 to provide a signal, Q, that is used by circuits 63 and 67 to extract the amplitude and phase, respectively, of the cantilever arm signal.

The present invention overcomes the delays inherent in the prior art integration approaches by more optimally choosing the integration period, T. This aspect of the present invention is based on the observation that if T is a positive integer number of the periods, $T_0$, of the mixing signal, the integration time can be reduced. That is, $T=2\pi M/\omega_0$. In this case, the integer, M, can be set as low as 1 and the demodulator still functions properly.

In one embodiment of the present invention, the integrations of I(t) and Q(t) are carried out digitally by sampling the outputs of mixers 61 and 65, respectively. To simplify the following discussion, only the integration of I(t) will be discussed in detail, as the integration of Q(t) can be performed in an analogous manner. Integrator 62 samples the output of mixer 61 at regular intervals separated by a time $T_s$. In general, $T_0$ and $T_s$ cannot be chosen arbitrarily. $T_0$ is set by the resonant frequency of the cantilever arm and cannot be changed significantly without altering the measurements being made. Furthermore, most systems utilize a fixed sampling period. Hence, in general there will be an integer N such that $N\,T_s \leq M\,T_0$ and $(N+1)T_s > M\,T_0$. In general, $$\int_0^T y(t)\,dt \approx \sum_{k=0}^{N+p} y_k w_k$$

Where y(t) is either I(t) or Q(t), $T=M\,T_0$, and $y_k=I(k\,T_s)$ or $Q(k\,T_s)$. The coefficients $w_k$ and p depend on the particular integration algorithm used. For example, the function being integrated can be approximated by a polynomial of a predetermined degree between the sampled points. The higher the order chosen for the polynomial, the greater the accuracy of the integral. However, p also increases with the order of the polynomial. It should be noted that the integral cannot be completed until p samples beyond T are accumulated, and hence, higher values of p introduce additional delays into the computation. Such delays increase the latency in the control loop. Accordingly, there is a tradeoff between latency and integration accuracy. As will be explained in more detail below, some of the errors incurred by using an algorithm based on a lower order polynomial can be corrected using a filter.

For the purposes of the present discussion, it will be assumed that the trapezoidal integration algorithm is utilized by integrators 62 and 66. In this case $$\int_0^{MT_0} y(t)\,dt \approx S, \text{ where}$$

$$S = \frac{T_s}{2}\left[y_0 + 2\sum_{k=0}^{N-1} y_k + y_N + h(y_{N+1} + y_N)\right]$$

Here, h corrects for the fact that the last sample is not taken at time $MT_0$. In general, the sampling rate will not exactly match the integration interval. That is, $MT_0 - N\Delta t = h\Delta t$, where $\Delta t$ is the time between samples.

The efficient computation of S is important for two reasons. First, any delay in computing S after the last sample $y_{n+1}$ is received increases the latency of the control loop, and hence is to be avoided. Second, the computational hardware that must be included in integrators 62 and 66, and hence, the cost of these integrators can be reduced if an efficient algorithm is utilized.

The sum, S, must be recomputed each time a new sample is generated from the mixer output. Denote the sum corresponding to a sample, k, being received by $S_k$. Then, $$S_k = \frac{T_s}{2}\left[y_k + 2\sum_{j=0}^{N-1} y_{k-j} + y_{k-N} + h(y_{k+1} + y_k)\right]$$

This equation can be re-written as follows $$S_{k+1} = S_k + \frac{T_s}{2}[y_{k+1} + y_k + y_{k+1-N} - y_{k-N} + h(y_{k+2} - y_k)]$$

Hence, when each new term is received, the integral can be computed from the previous result by the addition of a relatively small number of terms. The sequence is started with $S_0=0$, and each new integral is computed as soon as the next sample is generated. In addition, the number of samples that must be stored is independent of N. This form of the integration algorithm has one significant problem. If h is not known precisely, the successive integrals will accumulate an error resulting from the error in h that is introduced at each new computation. This problem can be avoided by defining the component of S that is updated based on its prior value such that this component no longer includes h. For example, $$S_k = \frac{T_s}{2}[I_k + h(y_{k+1} + y_k)]$$

and $$I_{k+1} = I_k + y_{k+1} + y_k - (y_{k-1-N} + y_{k-N})$$

where $$I_k = y_k + 2\sum_{j=1}^{N-1} y_{k-j} + y_{k-N}$$

The N+2 sample values of $y_k$ that must be stored at any time can be stored in a circular buffer memory in which only the oldest sample is overwritten as each new value is received. A pointer that points to the first memory location that now stores a particular sample is also updated with each new entry. In this manner, the minimal number of updates is needed when each new sample is received from one of the mixers.

The embodiments shown in FIG. 3 can utilize either digital or analog mixing. If the mixing function is performed digitally, the process for estimating the $I_{sum}$ and $Q_{sum}$ is as follows:

(1) sample the cantilever arm signal at a sampling rate $f_s=1/T_s$ to obtain s(k).

(2) multiply S(k) by sine and cosine signals sampled or generated at $f_s$.

(3) digitally integrate the mixed signals over an integral number of oscillation periods of the cantilever arm to provide $I_{sum}$ and $Q_{sum}$ (4) compute the amplitude and phase of the cantilever arm signal.

(5) use the computed amplitude and/or phase to adjust the position of the fixed end of the cantilever arm.

The computation of the amplitude and phase of the cantilever arm signal requires significant computational resources and is also subject to time delay constraints. Any time needed to compute the amplitude and phase of the cantilever arm signal adds a delay to the servo loop. For example, the magnitude and phase could be computed using the Cordic algorithms that are computationally very simple and efficient. However, these algorithms require one computational cycle per bit of accuracy, and hence, a 16 bit accuracy would introduce a delay of 16 clock cycles into the servo loop. Consider a system in which the processor that performs the computation is running at a clock speed Cp cycles per second and the signal is sampled at a lower clock rate, Cs cycles per second. The Cordic algorithms discussed above require 16 cycles of the processor clock. If the signal is sampled at a clock speed that is one tenth that of the processor, a delay equivalent to the sampling time of 1.6 samples is incurred during the computation.

Lookup tables provide a more time efficient method of computation; however, the tables are functions of two variables, and hence the tables require very large memories. In one embodiment of the present invention, a two-step method is used to reduce the size of the lookup tables. In this procedure, the values are scaled so as to restrict the input range of the table used in the lookup step. The values from the lookup table are then interpolated to provide the required accuracy. The procedure assumes that the amplitude and phase circuits 63 and 67 include hardware for multiplying and adding digital values to facilitate the computation of $x^2 = I_{sum}^2 + Q_{sum}^2$.

Figure 4:
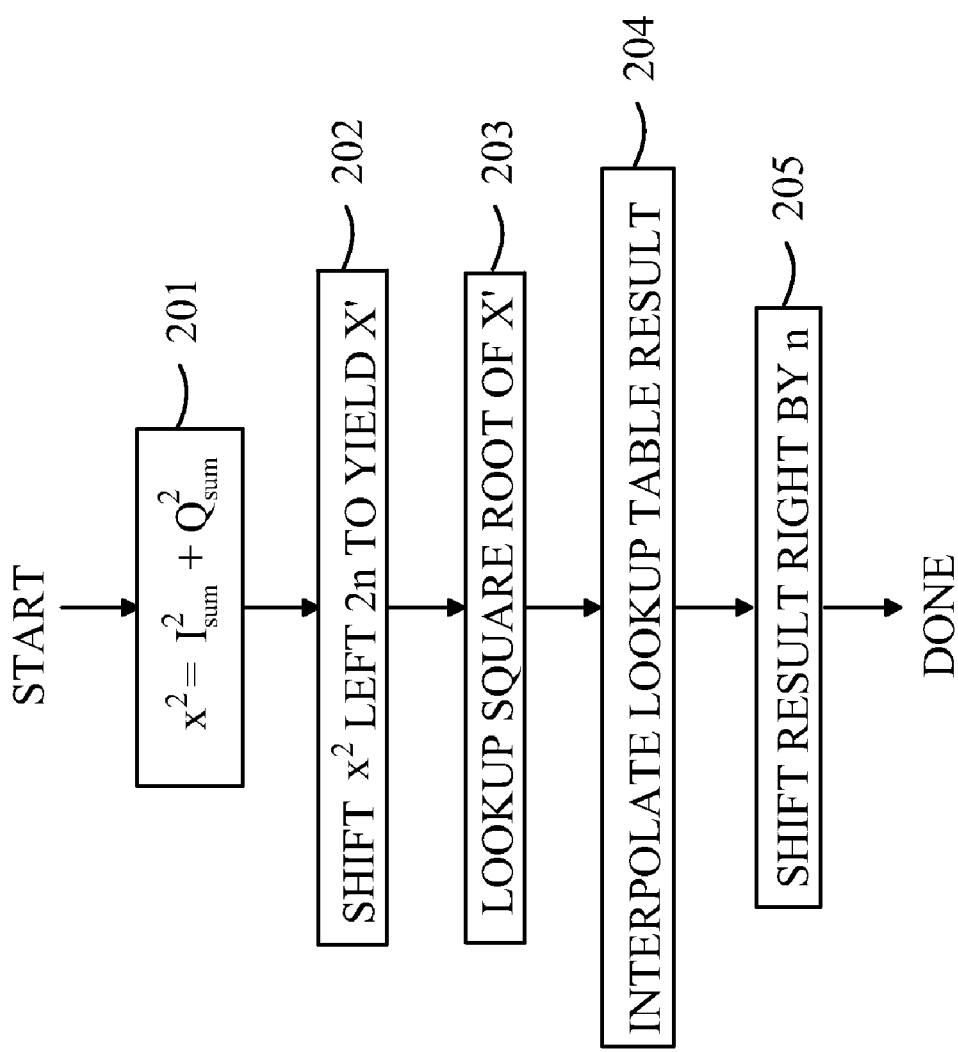
FIG. 4 is a flow chart of the method by which the amplitude is computed.

Refer now to FIG. 4, which is a flow chart of the method by which the amplitude is computed. This aspect of the present invention is based on the observation that the square root function for arguments between 0.5 and 2.0 requires a relatively small table that can be interpolated to provide additional accuracy in the results. In contrast, the slope of the square root function changes very rapidly near 0, which makes interpolation less accurate. In addition, if $x^2$ is represented by a 2's compliment notation, then $x^2$ will have one or more leading zeros, since $x^2$ is positive. The method begins by computing $x^2 = I_{sum}^2 + Q_{sum}^2$ as shown at 20. To scale the argument, $x^2$ is shifted an even number of places to the left to generate a number x' such that $0.5 \leq x' < 2$ as shown at 202. Denote the number of places by which $x^2$ was shifted by 2n. The argument, x', will begin with 01, 10, or 11.

The square root of x' is then approximated by using a lookup table as shown at 203. The approximation can be optionally refined by interpolating the lookup table values as shown at 204. For example, the m most significant bits of x' could be used to index the lookup table to provide an approximate value and a slope value equal to the slope of the square root function at the location specified by the m most significant bits. The least significant bits of x' could then be multiplied by this slope value and added to the approximation to refine the approximation.

Having obtained the approximation for the square root of x', the approximation is then shifted to the right by n places, as shown at 205, to provide the approximation to the magnitude of the cantilever arm signal. This method generates the approximation for the amplitude of the cantilever arm signal in between 4 and 7 clock cycles depending on whether or not the optional interpolation steps are included.

An analogous lookup table could be utilized to compute the phase of the cantilever arm signal. The procedure converts the problem of computing the $\arctan(Q_{sum}/I_{sum})$ for all possible ratios to one of looking up the arctan of a quantity that yields an angle between 0 and 45 degrees. This angle is then used to compute the phase. If $|I_{sum}| > |Q_{sum}|$, then the table is used to lookup the value of $\arctan(Q_{sum}/I_{sum})$. If $|I_{sum}| < |Q_{sum}|$, then the table is used to lookup the value of $\arctan(I_{sum}/Q_{sum})$ and this result is converted to $\text{arccot}(Q_{sum}/I_{sum})$.

Figure 5:
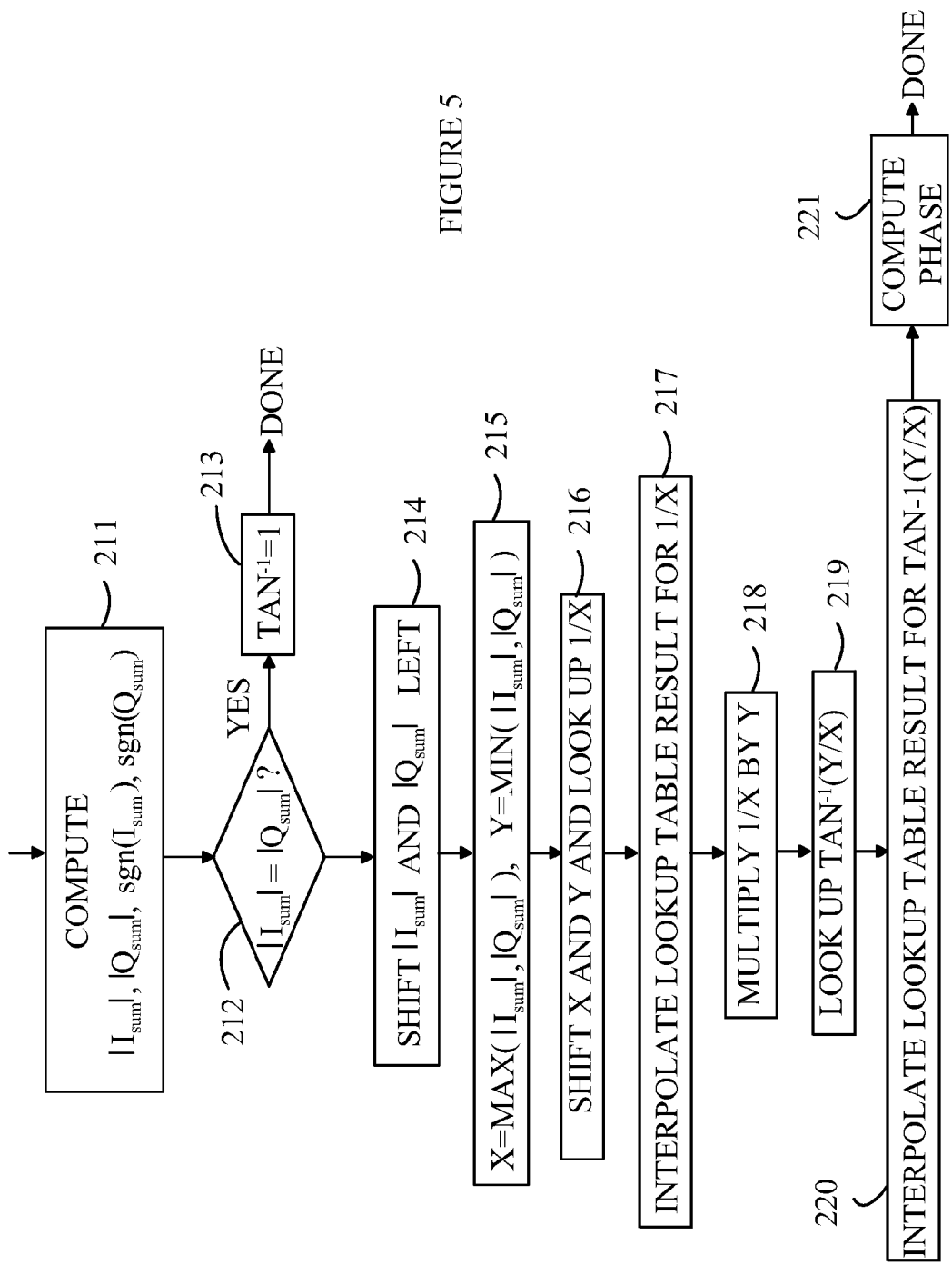
FIG. 5 is a flow chart of one method for calculating the arctangent in question.

Refer now to FIG. 5, which is a flow chart of one method for calculating the arctangent in question. The method begins by computing the absolute values of $I_{sum}$ and $Q_{sum}$ and the signs of these two quantities as shown at 211. The method then tests for the trivial case in which $I_{sum} = Q_{sum}$ as shown at 212 and sets the arctangent to 1 if this is the case as shown 213.

The problem here can be viewed as one of computing Y/X where X>Y and X and Y>0. Difficulties arise when X is small, since the slope of the function 1/X is too steep when X is small. Once again, this problem can be overcome by properly scaling the values of X and Y. Assume X is small, then X will have a number of leading 0s in 2s compliment notation. If X is shifted to the left by n places to eliminate these 0s, i.e., multiply X by $2^n$, then the resultant number is between 1 and 2. As a result, the value of 1/X will be between 0.5 and 1. In this region, an accurate lookup table result can be obtained. This result is then multiplied by Y after Y has been shifted to the left by the same number of bits. Since Y is less than X, the result will always be between 0 and 1.

Referring again to FIG. 5, $|I_{sum}|$ and $|Q_{sum}|$ are shifted to the left by n places where n is the number of leading 0s in the maximum of $|I_{sum}|$ and $|Q_{sum}|$ as shown at 214. X is set to the maximum of $|I_{sum}|$ and $|Q_{sum}|$, and Y is set to the minimum of $|I_{sum}|$ and $|Q_{sum}|$ as shown at 215. The values of X and Y are then both shifted left until X has no leading 0s, and a value for 1/X is found using a lookup table as shown at 216. This value can be refined by interpolation in a manner analogous to that discussed above as shown at 217. The final value for 1/X is then multiplied by Y, where Y is the lesser of $|I_{sum}|$ and $|Q_{sum}|$ as shown at 218. A second lookup table is then used to calculate an estimate of the arctan(Y/X) as shown at 219. This estimate can be refined by interpolating the second lookup table in a manner analogous to that discussed above as shown at 220. The final value of the arctangent is then used to calculate the phase using the signs and relative magnitudes of $|I_{sum}|$ and $|Q_{sum}|$ determined in step 211 as shown at 221. This maps the result from 0 to 45° onto the entire range of −180° to 180°.

While the above digital methods for obtaining the amplitude and phase of the cantilever arm signal reduce the latency introduced by the computational process, a significant latency can still remain. In one embodiment of the present invention, these calculations are simplified by adjusting the phase of the mixing signal. If the mixing signal is in phase with the cantilever arm signal, then $Q_{sum}$, on average, will be very near 0. Hence, the $I_{sum}^2 + Q_{sum}^2 \approx I_{sum}^2$, and hence, $I_{sum}$ is a good approximation to the amplitude of the cantilever arm signal. Furthermore, $Q_{sum}$ is a good approximation to the instantaneous phase difference between the mixing signal and the phase of the cantilever arm signal. Adding $Q_{sum}$ to the phase difference between the original drive signal the mixing signal gives the total phase of the return signal, relative to the drive signal. This is the equivalent result to the output of block 67 in FIG. 3, but with substantially less computational latency.

Figure 6A:
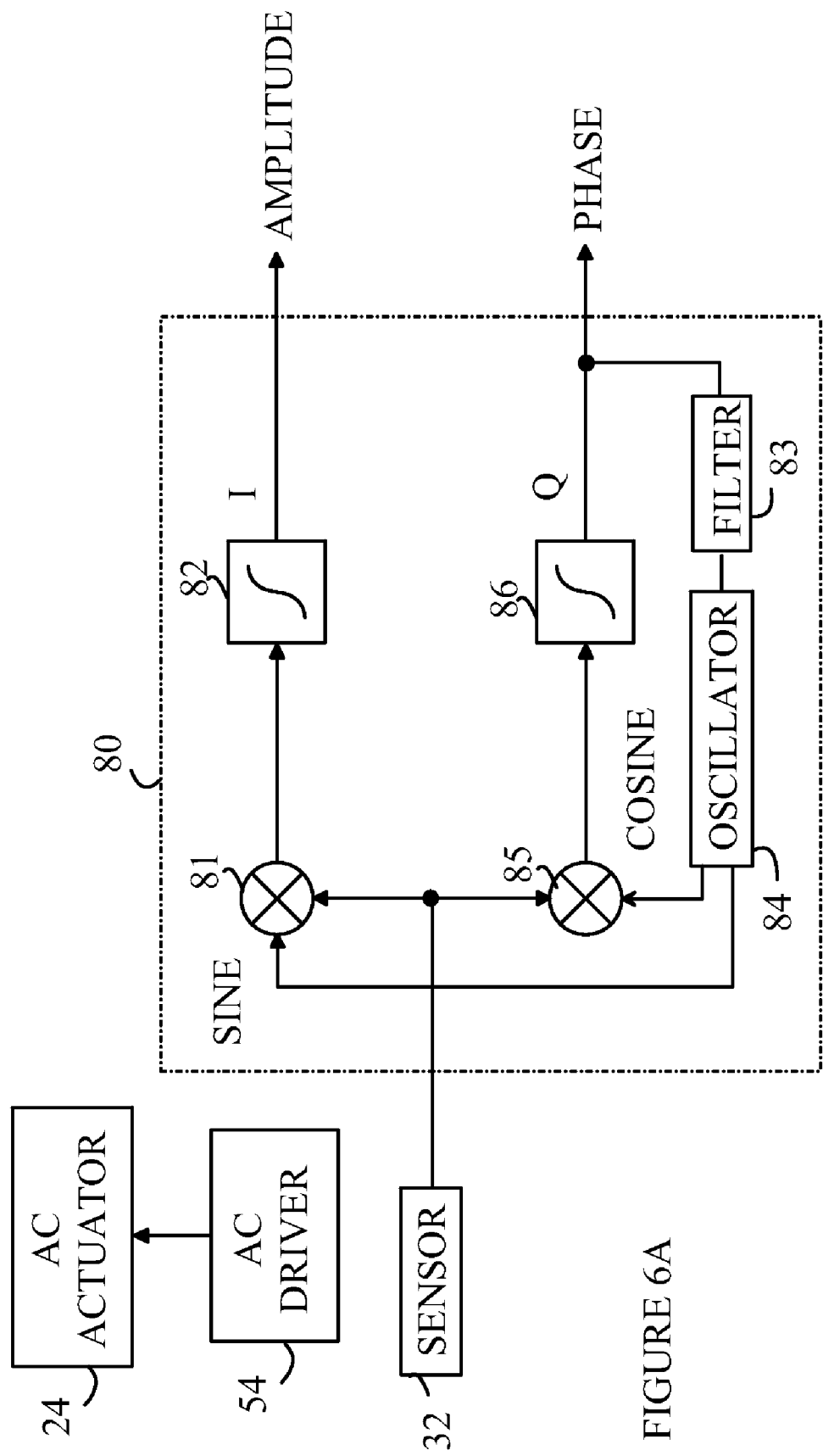
FIGS. 6A and 6B illustrate embodiments of a coherent demodulator according to the present invention that utilize a phase-locked loop.

Refer now to FIG. 6A, which illustrates another embodiment of a coherent demodulator according to the present invention. Coherent demodulator 80 uses a phase-locked loop to generate a reference signal for the mixers. The reference signal is locked to the frequency of the cantilever arm signal and has an average phase of 0 relative to the phase of the cantilever arm signal. The phase lock loop is implemented by using filter 83 and a controllable oscillator 84 to generate the reference signal from the $Q_{sum}$ signal generated by mixer 85 and integrator 86. Oscillator 84 also generates a 90 degree out of phase signal that is mixed with the cantilever arm signal at mixer 81 to generate a signal that is integrated by integrator 82 to provide $I_{sum}$, which, on average, is a good approximation to the amplitude of the cantilever arm signal.

It should be noted that coherent demodulator 80 can be implemented in digital or analog form. As noted above, the integrations are performed over an integral number of cycles of the cantilever arm signal and are more easily carried out using numerical techniques. Oscillator 84 can generate a sine and cosine function in digital form that are sampled at a rate that provides sufficient sampling accuracy to generate the mixing products numerically prior to the integration. Similarly, filter 83 can be implemented as a finite impulse response filter.

It should be noted that demodulator 80 does not introduce the computational latencies of the magnitude and phase calculations discussed above, and hence, significantly improves the performance of a feed back loop operating on the outputs of demodulator 80.

Figure 6B:
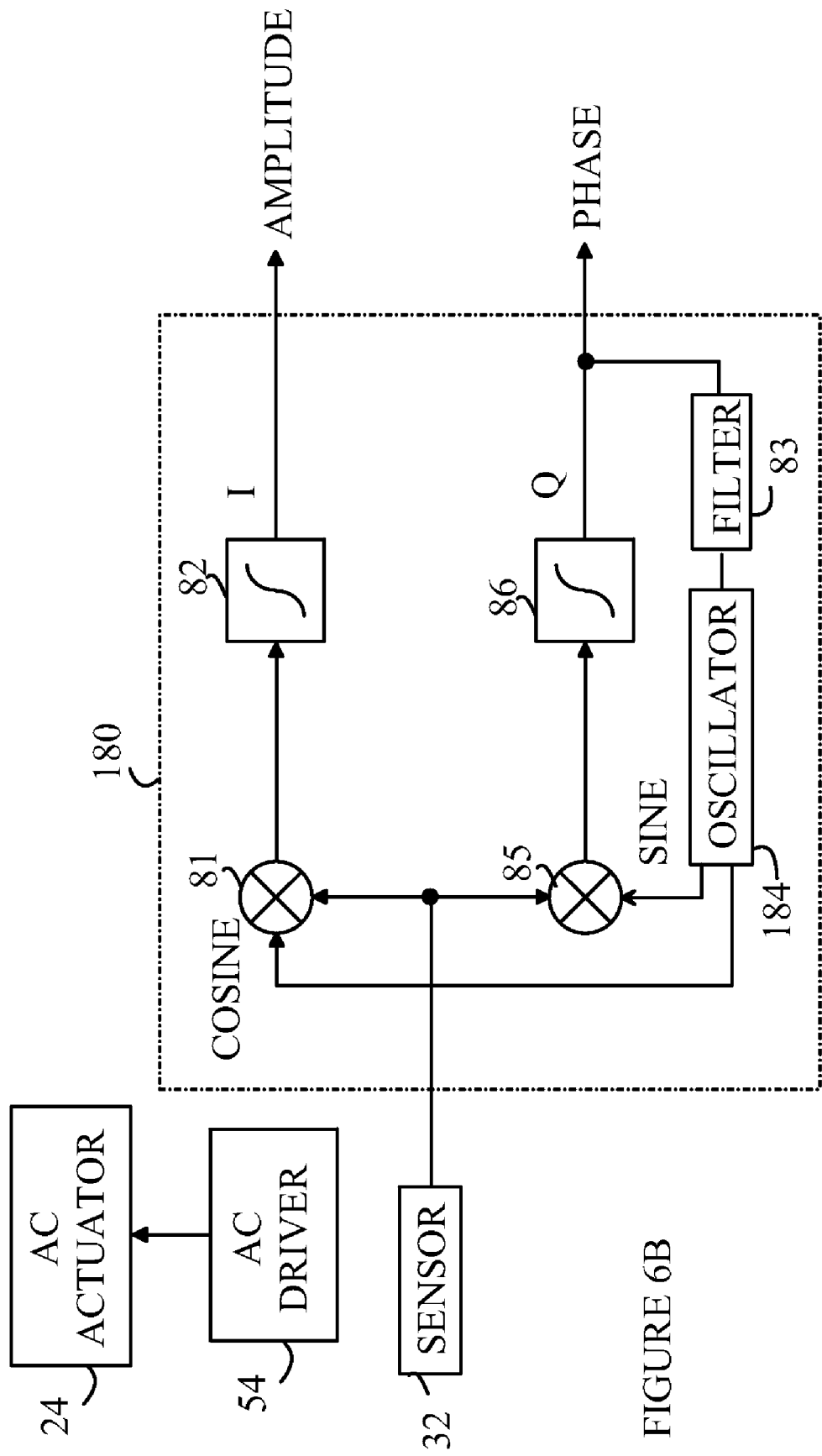

In the embodiments shown in FIG. 6A, the in phase component from the cantilever arm signal is assumed to be a sine wave. However, embodiments in which the in phase component of the cantilever arm signal is a cosine wave could also be utilized. Refer now to FIG. 6B, which illustrates another embodiment of a coherent modulator according to the present invention that uses a phase-locked loop. Demodulator 180 differs from demodulator 80 shown in FIG. 6A in that the reference oscillator 184 generates a reference signal for mixer 81 is a cosine wave and the reference signal for mixer 85 is a sine wave. It should be noted that as long as the reference oscillator generates one signal that is applied to mixer 85 and a signal that is 90 degrees out of phase with this signal that is applied to mixer 81, the demodulator will function as desired.

The above-described embodiments of the present invention utilize digital computations that have finite precision and that operate on discretely sampled signals. The sampling of the data is equivalent to approximating the sinusoids by stair step functions. In addition, the approximations of the integrals also introduce artifacts. As a result, DC offsets in the input signal and high harmonics in the output of the integrators can be present. These artifacts can be reduced by filtering the cantilever arm signal to remove any DC offset and filtering the output of the integrators to remove any higher harmonics.

Figure 7:
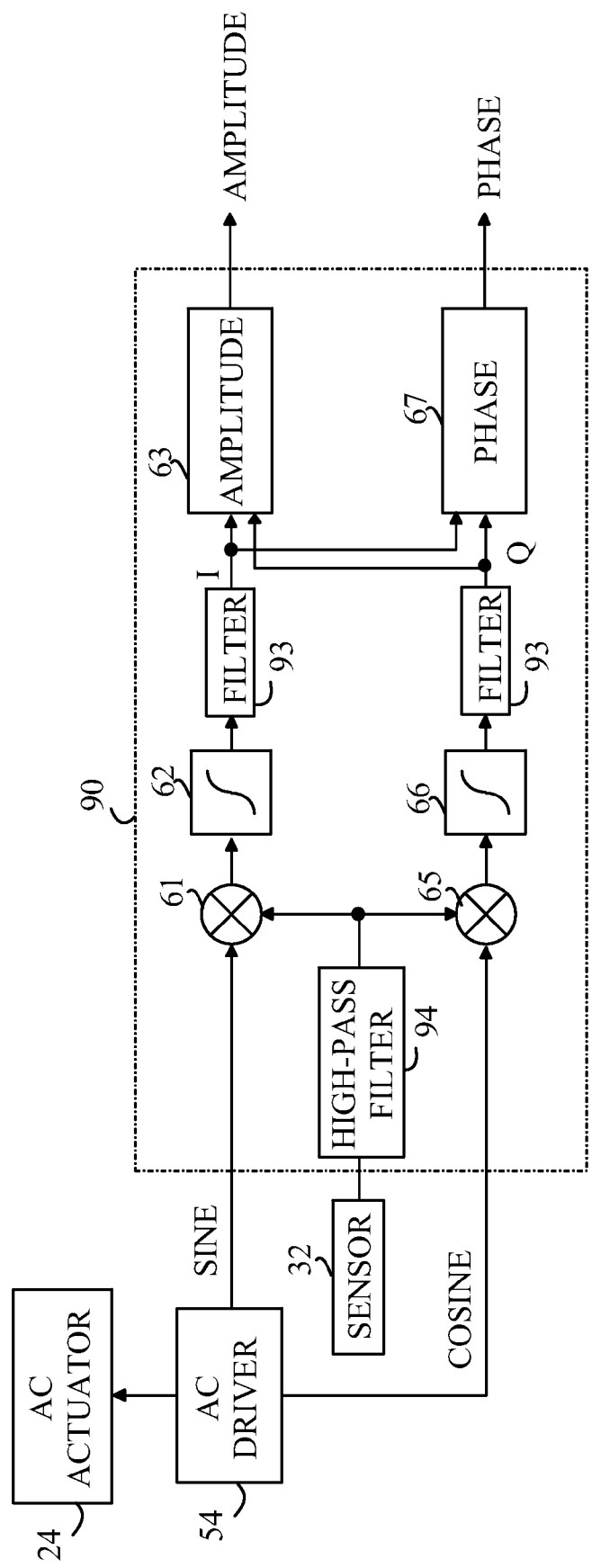
FIG. 7 illustrates another embodiment of a coherent demodulator according to the present invention.

Refer now to FIG. 7, which illustrates another embodiment of a coherent demodulator according to the present invention. Coherent demodulator 90 is a modified version of coherent demodulator 60 discussed above. In coherent demodulator 90, a high-pass filter 94 has been introduced between the cantilever arm position sensor 32 and mixers 61 and 65 to block any DC components in the cantilever arm signal. High-pass filter 94 can be implemented as a conventional high-pass filter or by subtracting a low-pass filtered component of the cantilever arm signal from the cantilever arm signal.

Figure 8:
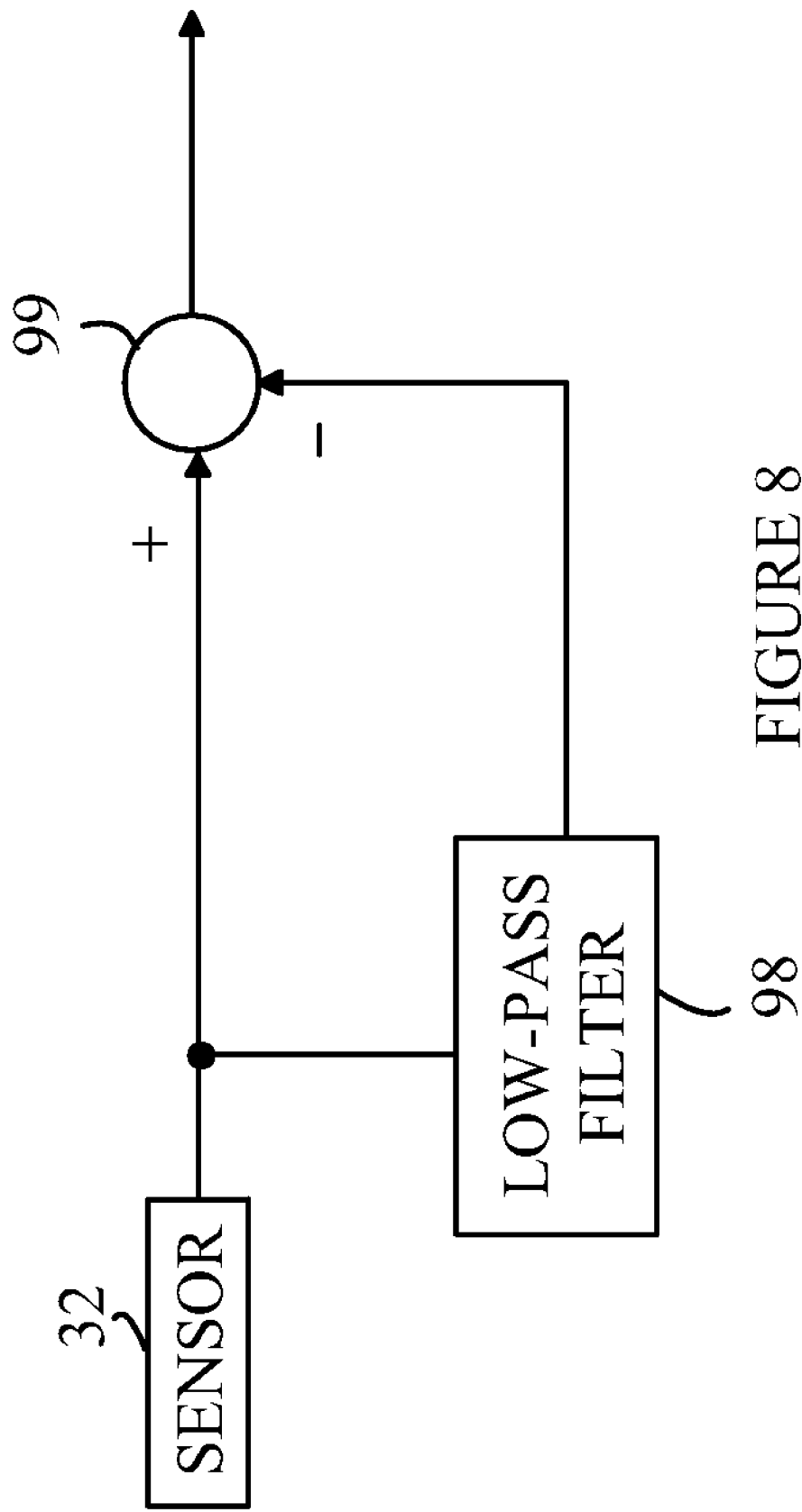
FIG. 8 illustrates one approach for removing the DC component from the cantilever arm signal.

Refer now to FIG. 8, which illustrates the latter approach for removing the DC component from the cantilever arm signal. The output of the cantilever arm sensor 32 is input to a low-pass filter 98 that generates a signal indicative of any DC offset in the cantilever arm signal. This filtered output is then subtracted from the cantilever arm signal by an adder 99. Since the output of the low-pass filter changes very slowly with time, the latency inherent in this filtering operation is essentially only that of the adder 99. In contrast, the latency of a high-pass finite impulse response filter is longer. Hence, this approach has a shorter latency relative to a conventional finite impulse response filter.

Refer again to FIG. 7. Coherent demodulator 90 also includes filters 93 located in the outputs of integrators 62 and 66 to block any harmonic artifacts. Harmonics of the original drive frequency are sometimes present in the output of the integration filters. While these signals are greatly reduced, in some applications a need exists to reduce the signals further. Filters 93 are used to reduce these artifacts. In one embodiment, filter 93 is implemented as a notch filter with a center frequency that is set to the frequency of the harmonic that is to be removed. If more than one harmonic is present, multiple filters must be utilized.

In another embodiment, filter 93 is an integration filter similar to integrators 62 and 66 shown in FIG. 3, but without any mixing or scaling of the input signal to the filter. That is, the output of each of the integrators 62 and 66 are input to another integrator, which integrates that input over an integer number of periods of the original sine wave. This method removes all harmonics at once. While the integration filters remove multiple harmonics, these filters lengthen the delay associated with the demodulator by at least half the period of the original since wave.

In contrast, a notch filter adds typically a few clock periods to the latency. In practice, the second harmonic of the drive frequency presents the greatest problem. A notch filter at this harmonic in combination with the DC-blocking filter 94 closely approximates the performance of an integration filter while introducing less latency into a feedback loop based on the demodulator.

Figure 9:
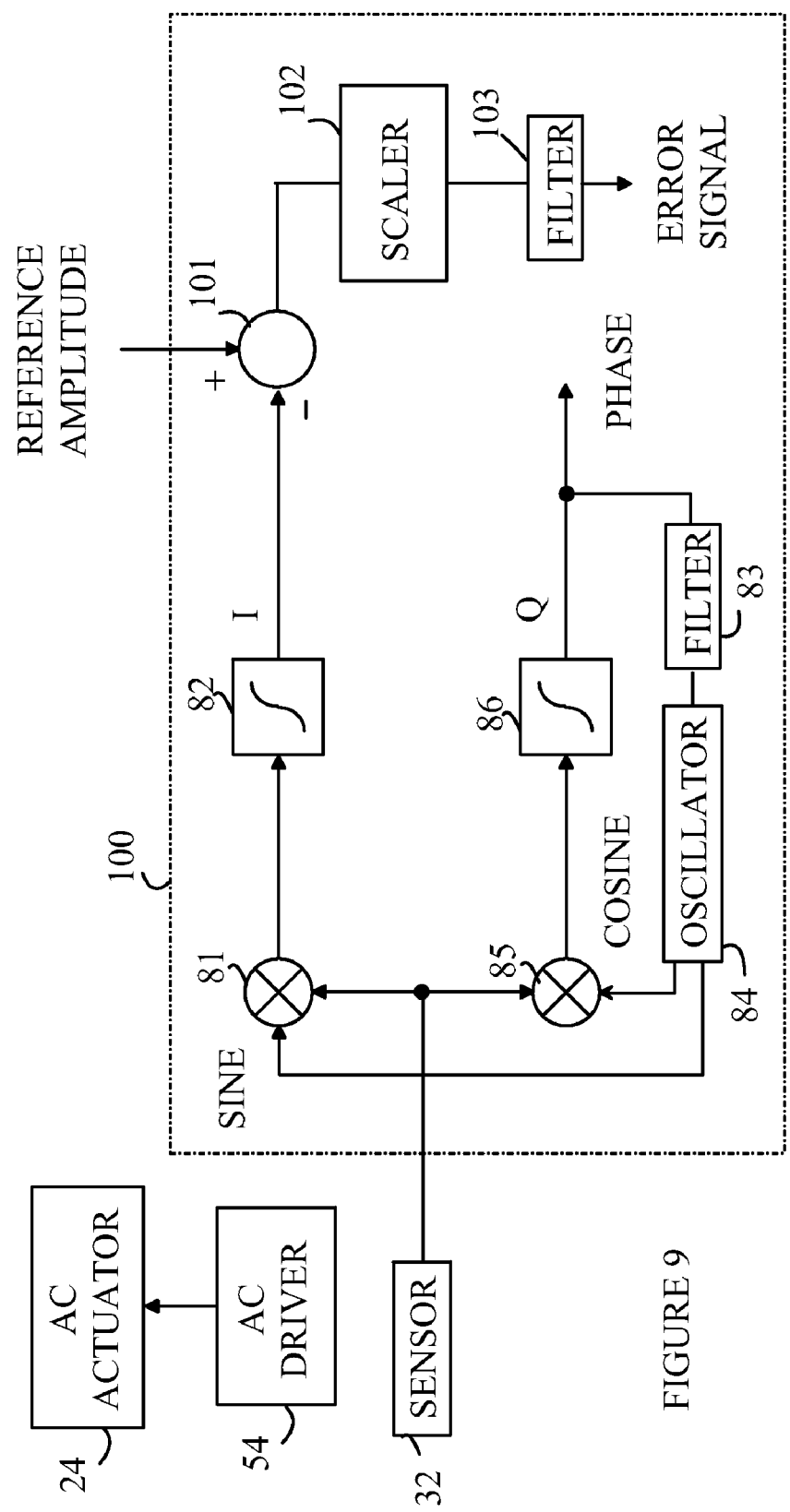
FIG. 9 illustrates another embodiment of a coherent demodulator according to the present invention.

A demodulator that utilizes the post processing filtering discussed above can be used to provide an improved feedback signal for adjusting the position of the fixed end of the cantilever arm. Refer now to FIG. 9, which illustrates another embodiment of a coherent demodulator according to the present invention. Coherent demodulator 100 is similar to coherent demodulator 80 discussed above with reference to FIG. 6 in that the mixing signal used to demodulate the cantilever arm signal is phase locked to the cantilever arm signal such that the in-phase signal is substantially equal to the amplitude of the cantilever arm signal. The servo loop in the atomic force microscope is adjusted to maintain the amplitude of the cantilever arm signal at a predetermined value. In coherent demodulator 100 the in-phase signal is subtracted from a reference signal by an adder 101. The output of adder 101 can be optionally scaled by scaling block 102 to provide an error signal that has the desired value when the amplitude of the cantilever arm signal is at the desired level. The output of scaling block 102, or adder 101 if scaling block 102 is not present, is filtered through filter 103 that removes any remaining harmonics of the cantilever arm signal. Scaling may be implemented using a multiplier or through bit shifting, in which the binary bits of a register representing a number are shifted to the left or the right to represent a multiplication by $2^n$ or $2^{-n}$. Often, doing scaling with bit shifting is computationally faster than a multiplication.

In the above-described embodiments, the sample is moved by the electro-mechanical actuator in all three directions. However, embodiments in which the actuator includes a first actuator that moves the cantilever arm in the z-direction while a second actuator moves the sample in the x-y plane could also be constructed. In addition, the actuator could move the cantilever in all three directions.

In the above-described embodiments, the cantilever arm assembly is shown at as being attached to the shaker element 24. The attachment can be made through a probe mount that allows different probe and cantilever arm configurations to be removably attached to the shaker element.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A demodulator comprising:
   an input port that receives an input signal having a frequency component at a signal frequency, the input signal characterized by a signal amplitude at that frequency;
   a first mixer that mixes said input signal with a first local oscillator signal at said signal frequency to generate a first mixed signal; and
   a first integrator that integrates said first mixed signal from a first time point to a second time point to provide a first output signal, wherein said second time point occurs at an integer number of periods of said signal frequency from said first time point.

2. The demodulator of claim 1 wherein said integer number of periods is equal to 1.

3. The demodulator of claim 1 wherein said local oscillator signal is phase-locked to said frequency component of said input signal.

4. The demodulator of claim 3 further comprising a phase-locked loop that controls said local oscillator signal.

5. The demodulator of claim 4 wherein said phase-locked loop comprises:
   a second mixer that mixes said input signal with a second local oscillator signal that is 90 degrees out of phase with said first local oscillator signal to provide a second mixed signal;
   a second integrator that integrates said second mixed signal for an integer number of periods of said signal frequency to provide a second output signal; and
   a servo loop that adjusts an oscillator such that said second output signal has an average signal intensity substantially equal to zero.

6. The demodulator of claim 3 further comprising a post processing filter for attenuating harmonics of said signal frequency in said first output signal to provide a filtered first output signal.

7. The demodulator of claim 6 wherein said post processing filter comprises a notch filter for attenuating a predetermined harmonic of said signal frequency.

8. The demodulator of claim 6 wherein said post processing filter comprises an integrator that integrates said first output signal over an integer number of periods of said signal frequency.

9. The demodulator of claim 6 further comprising a pre-processing filter for attenuating a DC level in said input signal.

10. The demodulator of claim 9 wherein said pre-processing filter comprises:
    a low-pass filter connected to said input port that generates a low-pass filter output signal; and
    a signal combiner for subtracting said low-pass filter output signal from said input signal.

11. The demodulator of claim 1 wherein said phase of said local oscillator signal is locked to said frequency component such that said first output signal has an amplitude substantially equal to said signal amplitude.

12. The demodulator of claim 1 further comprising a second mixer for mixing said input signal with a second local oscillator signal at said signal frequency to generate a second mixed signal, said second local oscillator signal being 90 degrees out of phase with said first local oscillator signal;
    a second integrator that integrates said second mixed signal for an integer number of periods of said signal frequency to provide a second output signal; and
    a processor that combines said first and second output signals to determine an amplitude for said input signal at said signal frequency.

13. The demodulator of claim 12 wherein said processor also determines a phase for said input signal at said signal frequency.

14. The demodulator of claim 12 further comprising
    an amplitude processor that determines an estimate of an amplitude for said input signal at said input frequency, said amplitude processor:
    forming a sum of the squares of said first and second output signals in a first binary word,
    shifting said first binary word by 2n bits in a first direction to obtain a first shifted word having a value between 0.5 and 2;
    looking up a square root value for said first shifted word in a square root table, said square root value being represented by a second binary word; and
    shifting said second binary word by n bits in a direction opposite to said first direction to obtain an estimate of said amplitude.

15. The demodulator of claim 14 further comprising looking up a slope value corresponding to said first shifted word in a second table; and
    correcting said second binary word by an amount depending on said slope value and said second binary word.

16. The demodulator of claim 12 further comprising
    a phase processor that determines an estimate of a phase for said input signal at said input frequency, said phase processor:
    providing first and second binary representations of the absolute values of said first and second output signals, respectively;
    shifting each of said binary representations by n places, where n is the number of leading zeros in the larger of said first and second binary representations;
    determining a value for 1/x from a lookup table, where x is the larger of said binary representations;
    determining an arctangent value for y/x from a lookup table, where y is the smaller of said binary representations and
    determining said phase from said arctangent value.

17. The demodulator of claim 16 further comprising determining an interpolation slope value for 1/x from said lookup table; and correcting said value of 1/x from said lookup table by an amount depending on said slope value.

18. The demodulator of claim 16 further comprising determining an interpolation slope value for said arctangent value from said lookup table; and correcting said arctangent value by an amount depending on said slope value.

19. A method for demodulating an input signal having a frequency component at a signal frequency, the input signal characterized by a signal amplitude at that frequency, said method comprising:

mixing said input signal with a first local oscillator signal at said signal frequency to generate a first mixed signal; and integrating said first mixed signal from a first time point to a second time point to provide a first output signal, wherein said second time point occurs at an integer number of periods of said signal frequency from said first time point.

20. The method of claim 19 wherein said first oscillator signal is phase locked to said frequency component such that said first output signal has an amplitude substantially equal to said signal amplitude.

* * * * *